Dec. 3, 1957    A. B. GRANDINETTE    2,815,211
ATHLETIC TRAINING BALL
Filed Nov. 4, 1955

INVENTOR.
ANTHONY B. GRANDINETTE
BY Richard von K. Bruns
Attorney

United States Patent Office 2,815,211
Patented Dec. 3, 1957

2,815,211

ATHLETIC TRAINING BALL

Anthony B. Grandinette, Syracuse, N. Y.

Application November 4, 1955, Serial No. 544,885

2 Claims. (Cl. 273—58)

This invention relates generally to athletic equipment for school playgrounds and the like, and has special reference to a training ball which is particularly adapted for use in teaching young children to learn the skills of throwing and catching in a harmless, pleasurable manner.

In most schools, park playgrounds, and the like, where organized recreational and athletic programs for children are conducted, the younger children are given training in the rudimentary skills of throwing and catching a ball before being allowed to participate in regular games of softball or baseball. At the present time, a regulation softball is usually used for this training but it has been found that such a ball is not very satisfactory for the purpose because it is too hard. Thus, the ball can hurt a child if it hits him in the face or on the end of a finger, and one or more such occurrences can cause a child to become afraid of the ball and lose confidence in his own ability to learn to play with it. This is particularly true among little children in the primary and elementary grades in school, and is of course a very undesirable thing since it retards the teaching process and is psychologically bad for the child.

In order to solve this problem and provide a safer, more practical instrumentality for teaching young children to play ball, the present invention contemplates and has as its primary object the provision of an athletic training ball which generally resembles a conventional softball but is constructed in such a manner that it is considerably softer and more elastic. The materials comprising the ball and the relative arrangement of these materials are such that the ball is readily compressible when it hits or is hit by any object although it quickly springs back into shape thereafter. The ball is, therefore, incapable of hurting a child since it is soft and yielding upon impact rather than hard and inflexible, and as a result it can be used in working with even very small children with beneficial results.

Another important object of the invention is to provide an athletic training ball which, even though it is relatively soft and elastic as above noted, is similar in other respects to a conventional softball, the training ball being similar in size, appearance, weight and action. Thus, the ball is capable of being hit with a bat and will travel in the manner of a softball when batted or thrown, although it is not as lively and will not travel as far. A ball used in training children should not be too lively, and yet it should not be like a ball made wholly of cotton which is too soft and does not have any of the desired characteristics above mentioned.

A further important object of the invention is to provide an athletic training ball for children which is particularly adapted for use in small or restricted play areas.

A still further important object of the invention is to provide an athletic training ball for children which is relatively inexpensive to manufacture and at the same time is very strong and durable.

Other objects and advantages of the invention will become apparent from the following detailed description thereof read in conjunction with the accompanying drawings which illustrate a typical embodiment of the invention for the purpose of disclosure.

Having reference now to the drawings, wherein like reference numbers designate the same part in each of the views, 10 generally indicates an athletic training ball which is essentially comprised of a spherical core 11, a pair of fabric batting members 12 positioned on the core, and an outer covering 14 enclosing the batting members. The core 11 is preferably formed of a single piece of sponge rubber, the rubber being of medium gauge porosity so that the core has body and yet is very resilient. Thus, the sponge rubber employed should not be as soft and porous as a kitchen type synthetic sponge which is more air space than rubber, nor should it be the opposite extreme which is a relatively firm, high density sponge rubber.

Figure 1:
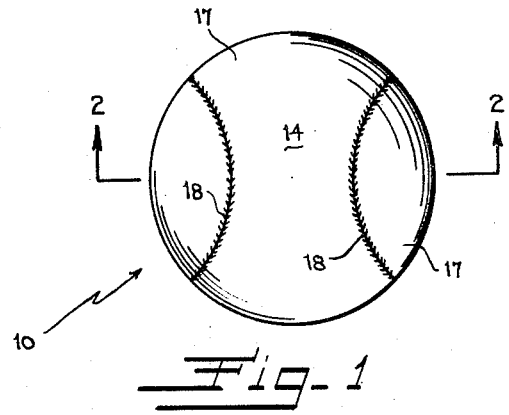
Figure 1 is a top plan view of an athletic training ball embodying the invention.
Figure 2:
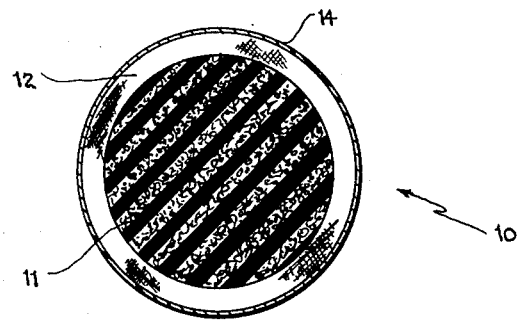
Figure 2 is a vertical section through the ball taken on line 2—2 of Figure 1.
Figures 3, 4:
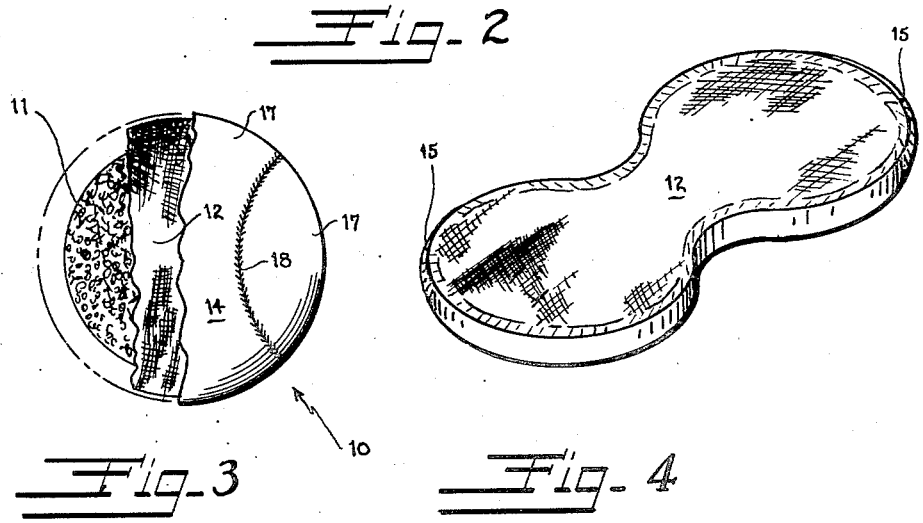
Figure 3 is a plan view of the ball with the outer cover and intermediate layer broken away to more fully indicate the construction.
Figure 4 is a top perspective view of one of the fabric batting members comprising a portion of the ball.

The fabric batting members 12 are preferably formed of pressed cotton felt or similar batting material, and each member is substantially dumbbell or hourglass shaped as best shown in Figure 4. The dumbbell conformation of the two batting members enables them to be complementally positioned on the core so that they completely enclose it and form a batting layer of uniform thickness therearound. However, in order to insure a perfectly spherical outer surface with proper edge alignment between the batting members, the marginal edges thereof are slightly tapered or bevelled as indicated at 15.

The outer cover 14 of the training ball is comprised of a pair of substantially dumbbell shaped leather members 17 which are complementally positioned on the batting members 12 so that they completely enclose the members. The cover is thus assembled in the usual manner of assembling baseball or tennis ball cover members, and the abutting marginal edges of the members are secured together by conventional cross stitching 18 to form a strong and durable protective cover. The leather is preferably cowhide or horsehide so that the cover will be able to withstand the scuffing and hard wear that a ball usually receives on a school playground.

The materials comprising the training ball disclosed herein and also the arrangement of these materials are very important in obtaining a ball having the desired characteristics for training young children in the skills of throwing and catching. The single piece sponge rubber core 11 gives the ball resiliency and elasticity and also imparts liveliness. The cotton felt members 12 prevent the ball from being too lively, and because they are in batting or strip form they supply firmness. Windings of any kind are not used since they tend to render the ball too hard and inflexible. When the training ball hits a person or object, both the fabric batting and sponge rubber core are compressed so that the shock of impact is absorbed by them and is not transmitted to any extent. After the impact, the ball quickly springs back into shape due to the resiliency of the sponge rubber core.

The relative proportions of the materials in the ball are also important. Thus, if the layer of batting is too thick relative to the core, the ball will be too dead and will not travel or act as it should. On the other hand, if the batting is too thin relative to the core, the ball will be too lively and will be difficult to catch and to control generally. On a ball having an over-all radius of 2¼ inches, which is approximately the size of a conventional softball, the sponge rubber core should have a radius which is approximately three-fourths the over-all radius in order to give the ball the desired characteristics noted above. For example, in one practical embodiment of the ball which possesses these characteristics and has been successfully used in training young children, the radius of the sponge rubber core is 1¹¹⁄₁₆ inches, the cotton felt batting is ½ inch thick and the leather cover is ¹⁄₁₆ inch thick. These dimensions, of course, can be modified within reasonable limits without changing the general characteristics of the ball.

From the foregoing description it will be apparent that the invention disclosed herein provides a harmless and very practical ball for training young children in the skills of throwing, catching, and the like. Because the ball cannot hurt a child, the child does not develop a fear of the ball and instead gains confidence in his own ability to learn. In addition, the similarity of the ball to a conventional softball enables children to switch over to the latter with skill and assurance when the proper time comes.

The invention may be embodied in other specific forms without departing from the spirit or essential characteristics thereof. The embodiment disclosed is therefore to be considered in all respects as illustrative and not restrictive, the scope of the invention being indicated by the appended claims.

What is claimed is:

1. An athletic training ball comprising an outer leather cover having a thickness of approximately one-sixteenth of an inch, a layer of fabric batting directly beneath said cover, said batting having a thickness of approximately one-half of an inch, and a spherical inner core formed of a single piece of resilient, compressible material directly beneath said layer of batting, said core having a radius of approximately one and three-fourths inches.

2. An athletic training ball comprising a spherical inner core formed of a single piece of medium gauge sponge rubber to impart liveliness to the ball, said inner core having a radius of approximately one and three-fourths inches, a pair of substantially dumbbell shaped pieces of pressed cotton felt batting having a thickness of approximately one-half of an inch positioned directly adjacent said core in complemental relation to one another to entirely surround the core and deaden some of the liveliness thereof, the outer surfaces of said batting pieces being tapered adjacent the marginal edges thereof, and a pair of substantially dumbbell shaped pieces of leather having a thickness of approximately one-sixteenth of an inch positioned directly adjacent said pieces of batting in complemental relation to one another to completely enclose the batting, said pieces of leather being permanently secured together at the abutting marginal edges thereof to form a durable outer covering for the ball.

References Cited in the file of this patent

UNITED STATES PATENTS

| | | |
|---|---|---|
| 929,013 | Reach | July 27, 1909 |
| 1,502,784 | Kennedy | July 29, 1924 |
| 1,803,121 | Meurisse | Apr. 28, 1931 |
| 2,105,861 | Klecka | Jan. 18, 1938 |